(12) United States Patent
Abadeer et al.

(10) Patent No.: US 7,825,469 B2
(45) Date of Patent: Nov. 2, 2010

(54) THRESHOLD VOLTAGE COMPENSATION FOR PIXEL DESIGN OF CMOS IMAGE SENSORS

(75) Inventors: Wagdi W. Abadeer, Jericho, VT (US); John A. Fifield, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/850,488

(22) Filed: Sep. 5, 2007

(65) Prior Publication Data

US 2009/0057804 A1    Mar. 5, 2009

(51) Int. Cl.
*H01L 29/72* (2006.01)
(52) U.S. Cl. .................. 257/347; 257/431; 257/446; 348/222.1
(58) Field of Classification Search .................. 257/347, 257/416, 431; 348/222.1
See application file for complete search history.

(56) References Cited

U.S. PATENT DOCUMENTS 6,667,767 B1 * 12/2003 Muramatsu et al. ......... 348/243
6,876,235 B2    4/2005 Li et al.

* cited by examiner

*Primary Examiner*—Edward Wojciechowicz
(74) *Attorney, Agent, or Firm*—W. Riyon Harding; Hoffman Warnick LLC

(57) ABSTRACT

The present disclosure is directed to a CMOS active pixel sensor that compensates for variations in a threshold voltage of a source follower contained therein. A structure in accordance with an embodiment includes: a replica source follower transistor; a system for creating a current in said replica source follower transistor such that a gate-source voltage of said replica source follower is substantially equal to a threshold voltage of said replica source follower; and a current mirror for biasing the isolation source follower transistor at a same current density as the replica source follower transistor.

4 Claims, 3 Drawing Sheets

THRESHOLD VOLTAGE COMPENSATION FOR PIXEL DESIGN OF CMOS IMAGE SENSORS

BACKGROUND

The disclosure generally relates to CMOS (complementary metal-oxide-semiconductor) image sensors employing pixels designs that utilize source followers for isolation devices, and more specifically relates to a CMOS image sensor that reduces the dependency of a pixel's output level on variations in the threshold voltage of the source follower.

An image sensor is a device that converts a visual image to an electric signal, such as those commonly found in digital cameras and other imaging devices. An active pixel sensor (APS) is an image sensor consisting of an integrated circuit containing an array of pixel sensors, and are produced by a CMOS process (hence the term "CMOS image sensors"), and are emerging as an inexpensive alternative to charge couple devices (CCDs).

Source followers are used for isolation devices in CMOS imaging sensors. An illustrative implementation of a CMOS imaging sensor typically includes a photo diode (PD) in which incident light causes the generation of minority carriers, and a reset transistor that performs the function of resetting the photo diode to the supply voltage Vdd. The signal which is the difference between the reset voltage and the voltage on the photo diode is applied to the gate of a source follower. The signal at the source of the source follower is then transmitted to a row select transistor. Accordingly, the source follower is used to drive the analog signal from the individual pixel cells out onto a shared column line. However, the operation of the pixel is strongly affected by the variations and tolerance of the threshold voltage Vt associated with the source follower. The threshold voltage Vt is subject to variations, e.g., as function of temperature and process parameters.

Accordingly, a need exists for a solution that can address unwanted variations in the output voltage of an active pixel sensor (APS).

SUMMARY

The disclosure relates to a structure and method for canceling variations in the output voltage of an active pixel sensor (APS) resulting from variations in threshold voltage in a source follower transistor.

A first aspect is directed to a structure for canceling variations in an output voltage of a CMOS active pixel sensor (APS) resulting from variations in a threshold voltage in an isolation source follower transistor contained in said CMOS active pixel sensor, the structure comprising: a replica source follower transistor; a system for creating a current in said replica source follower transistor such that a gate-source voltage of said replica source follower is substantially equal to a threshold voltage of said replica source follower; and a current mirror for biasing the isolation source follower transistor at a same current density as the replica source follower transistor.

A second aspect is directed to an integrated circuit having an active pixel sensor, the integrated circuit comprising: a pixel cell for generating an analog signal in response to detecting a light source; an isolation source follower transistor having a gate for receiving the analog signal and a source for outputting a source follower signal, wherein the source is coupled to a first current source; a replica source follower transistor having a gate for receiving a fixed voltage from a bandgap reference circuit and a source for outputting a reference voltage, wherein the source of the replica source follower transistor is coupled to a second current source, and wherein the isolation source follower transistor and replica source follower transistor are biased with substantially identical current densities; and a comparator for comparing the source follower signal with the reference voltage.

A third aspect is directed to a design structure embodied in a machine readable medium used in a design flow process, the design structure comprising a circuit, the circuit comprising: a pixel cell for generating an analog signal in response to detecting a light source; an isolation source follower transistor having a gate for receiving the analog signal and a source for outputting a source follower signal, wherein the source is coupled to a first current source; a replica source follower transistor having a gate for receiving a fixed voltage from a bandgap reference circuit and a source for outputting a reference voltage, wherein the source of the replica source follower transistor is coupled to a second current source, and wherein the isolation source follower transistor and replica source follower transistor are biased with substantially identical current densities; and a comparator for comparing the source follower signal with the reference voltage.

A fourth aspect is directed to a method for canceling variations in the output voltage of a CMOS active pixel sensor (APS) resulting from variations in threshold voltage in an isolation source follower transistor contained in said CMOS active pixel sensor, comprising: creating a bias current in a replica source follower transistor biased at a voltage threshold; and creating a sensing reference from the replica source follower transistor, said sensing reference being used to sense a light level of a CMOS active pixel cell.

The illustrative aspects of the present disclosure are designed to solve the problems herein described and other problems not discussed.

BRIEF DESCRIPTION OF THE DRAWINGS

These and other features will be more readily understood from the following detailed description taken in conjunction with the accompanying drawings.

Figure 1:
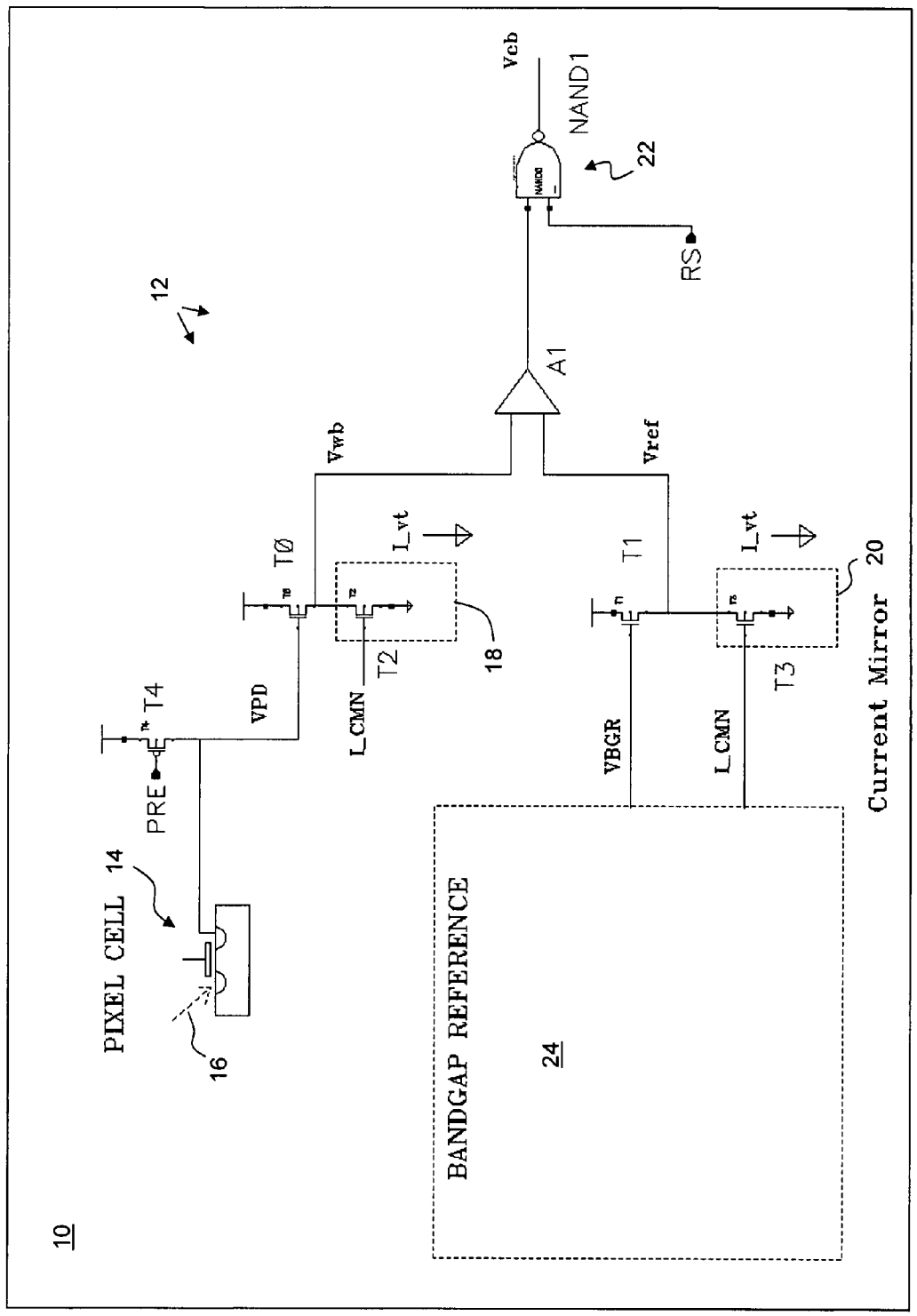
FIG. 1 depicts an integrated circuit (IC) including an active pixel sensor in accordance with an embodiment of the disclosure.

The drawings are merely schematic representations, not intended to portray specific parameters of the present disclosure. The drawings are intended to depict only typical embodiments of the disclosure, and therefore should not be considered as limiting the scope of the disclosure. In the drawings, like numbering represents like elements.

DETAILED DESCRIPTION

Referring to FIG. 1, an integrated circuit (IC) 10 is shown having an active pixel sensor (APS) 12. APS 12 generally includes a pixel cell 14, a precharge transistor T4, an isolation source follower transistor T0, a current source 18, a comparator A1, and output logic 22. As noted above, a problem encountered in prior art APSs is that the threshold voltage associated with source follower transistor T0 may vary based on, e.g., temperature and other processing conditions. Accordingly, the resulting output signal Vwb will likewise vary.

The present disclosure addresses this issue by implementing a second source follower transistor T1, referred to herein as a "replica" source follower transistor T1, that outputs a reference voltage Vref that varies in the same manner as output signal Vwb. Comparator A1 is then used to capture a difference between Vwb and Vref, which provides a measurement that is independent of variations in the threshold voltage Vt. The replica source follower transistor T1 may be contained in the column circuitry of an active pixel sensor array that includes the isolation source follower transistor T0.

Details of the circuit for implementing APS 12 are as follows. Pixel cell 14 senses light 16, and generates an analog signal VPD on a bit line, which is precharged by transistor T4. Precharge input signal PRE operates to precharge node VPD to a first voltage such that as light creates a charge flow within pixel 14, a potential drop can occur on VPD producing a second voltage lower than the first. (Accordingly, although not shown, APS 12 would typically include a plurality of selectable pixel cells 14 coupled to VPD in an APS array.) VPD is then fed to the gate of source follower transistor T0, which in turn outputs a follower signal Vwb at the source of T0. The source of T0 is also coupled to a current source 18 that generates a current I_vt. Current source 18 utilizes a transistor T2 that is controlled by a control signal I_CMN from bandgap reference 24 (or other convenient means).

As noted above, a replica source follower transistor T1 is provided that receives a fixed, stable (i.e., temperature independent) voltage VBGR from bandgap reference 24 at the gate. Similar to source follower transistor T2, replica source follower T1 includes a source that is coupled to a current source 20, which acts as a current mirror and provides the same current I_vt. Current source 20 includes a transistor T3 that is similarly controlled by bandgap reference 24 via control signal I_CMN. Replica source follower transistor T1 and source follower transistor T0 are accordingly biased with identical currents, ideally in their saturated regions, i.e., at common voltage operating points. Namely, a gate-source voltage of the replica source follower transistor T1 is substantially equal to a threshold voltage of the replica source follower transistor. Thus, replica source follower T1 generates a signal Vref that will vary from threshold variations essentially the same as node Vwb will vary from threshold variations.

Comparator A1 is then used to subtract the voltage of the replica source follower Vref from that of the selected APS cell. The resulting value that is thereafter fed to output logic 22 is independent of voltage threshold variations of the source follower T0 in the APS cell. Comparator A1 may for example be implemented as a differential or sense amplifier. In addition, bandgap reference 24 may be implemented in any fashion to generate a voltage and/or current reference, and such circuits are commonly known in the art. Alternate means, such as an off-chip reference could likewise be used. It is also understood that while current source transistors T2 and T3 are shown with the sources connected to ground, they could be coupled to some voltage less than ground to, e.g., accommodate low power supply levels.

In summary, pixel cell 14 is connected to a threshold compensated sensing system comprised of an isolation source follower transistor T0, a first constant current source T2, a source follower reference device T1, a second constant current source T3, and a comparator A1. A voltage reference VBGR and a constant current source I_CMN are provided by a bandgap reference circuit.

A sensing operation begins with line VPD precharged to Vdd by input PRE. When light energy E=hv strikes the pixel's collection diffusion, electrons gather on line VPD and lower the VPD's voltage. Device T0 is biased at a current I_vt by current mirror device T2 which establishes a Vt drop from gate to source. As the gate of source follower T0 drops, node Vwb responds and follows (i.e., VPD–Vt). Node Vwb forms a first input of comparator A1.

An on-chip bandgap reference circuit 24 outputs a stable reference voltage VBGR and a current mirror voltage I_CMN. A replica source follower transistor T1, similar to source follower T0 has its gate connected to VBGR, and its drain and source connected to Vdd and node Vref respectively. A current supply formed by a current-mirror T3 is also driven by bandgap reference output I_CMN, and establishes a current I_vt which is defined by the current level of transistor T1 when T1 is biased at Vgs=Vt. In this example, $I\_vt = 100 \times W/L$ nanoAmps where W/L is the width to length ratio of T1. Reference voltage Vref is now defined as:

$Vref = VBGR - Vt.$

Reference line Vref is a second input to the comparator A1 and provides the reference for differential sensing. If the pixel output line Vwb increases or decreases from variations in NFET Vt, the reference line Vref increases or decreases correspondingly. Thus, a sensing system has been established wherein signal degradations from Vt variations have been essentially eliminated.

Figure 2:
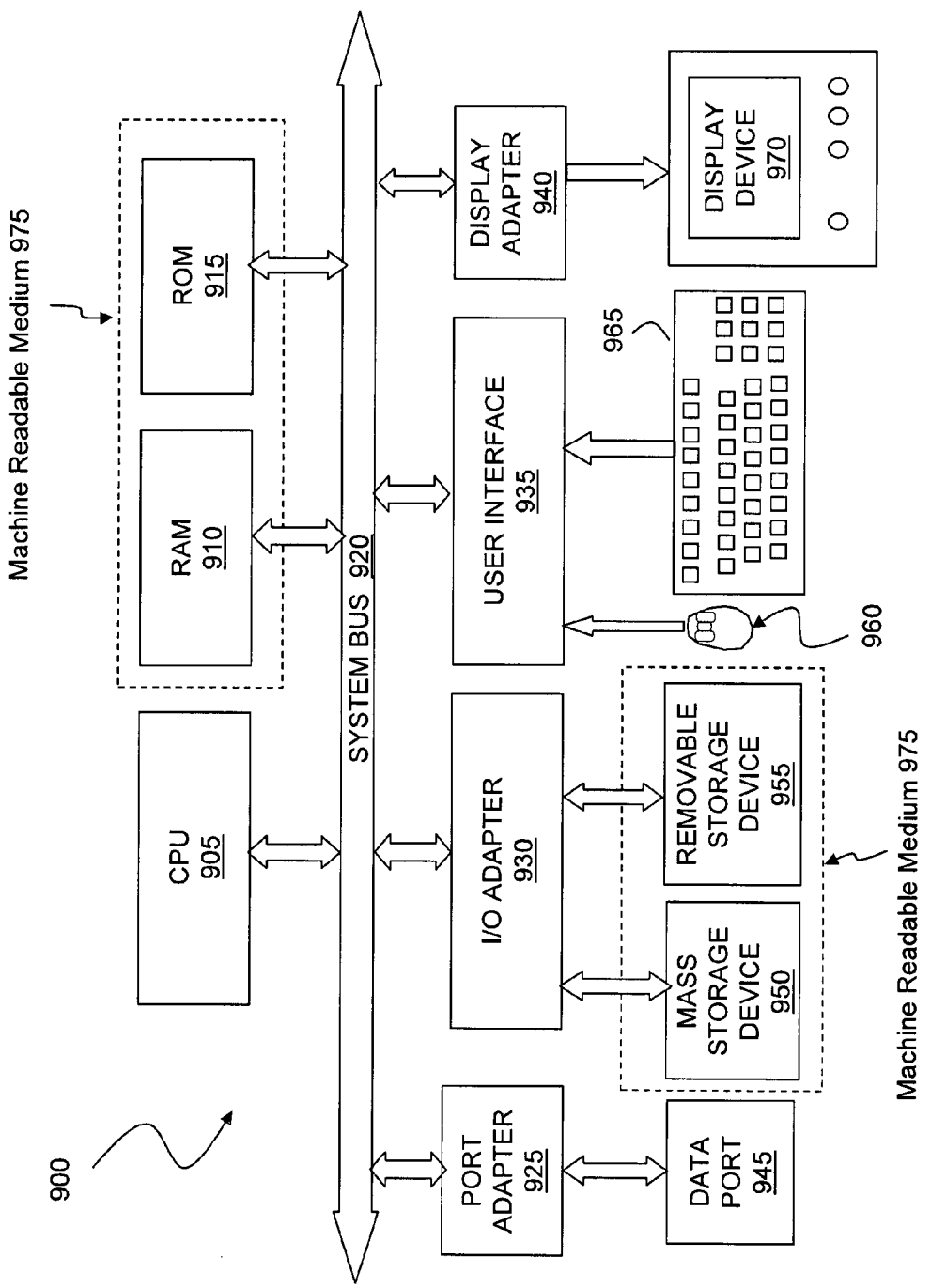
FIG. 2 depicts a block diagram of a general-purpose computer system which can be used to implement the active pixel sensor, IC, and circuit design structure described herein.

FIG. 2 depicts a block diagram of a general-purpose computer system 900 that can be used to implement circuit design structures APS 12 and IC 10 described herein. The design structure may be coded as a set of instructions on removable or hard media for use by the general-purpose computer 900. The computer system 900 has at least one microprocessor or central processing unit (CPU) 905. The CPU 905 is interconnected via a system bus 920 to machine readable media 975, which includes, for example, a random access memory (RAM) 910, a read-only memory (ROM) 915, a removable and/or program storage device 955, and a mass data and/or program storage device 950. An input/output (I/O) adapter 930 connects mass storage device 950 and removable storage device 955 to system bus 920. A user interface 935 connects a keyboard 965 and a mouse 960 to the system bus 920, a port adapter 925 connects a data port 945 to the system bus 920, and a display adapter 940 connect a display device 970. The ROM 915 contains the basic operating system for computer system 900. Examples of removable data and/or program storage device 955 include magnetic media such as floppy drives, tape drives, portable flash drives, zip drives, and optical media such as CD ROM or DVD drives. Examples of mass data and/or program storage device 950 include hard disk drives and non-volatile memory such as flash memory. In addition to the keyboard 965 and mouse 960, other user input devices such as trackballs, writing tablets, pressure pads, microphones, light pens and position-sensing screen displays may be connected to user interface 935. Examples of the display device 970 include cathode-ray tubes (CRT) and liquid crystal displays (LCD).

A machine readable computer program may be created by one of skill in the art and stored in computer system 900 or a data and/or any one or more of machine readable medium 975 to simplify the practicing of this invention. In operation, information for the computer program created to run the present invention is loaded on the appropriate removable data and/or program storage device 955, fed through data port 945, or entered using keyboard 965. A user controls the program by manipulating functions performed by the computer program and providing other data inputs via any of the above mentioned data input means. The display device 970 provides a way for the user to accurately control the computer program and perform the desired tasks described herein.

Figure 3:
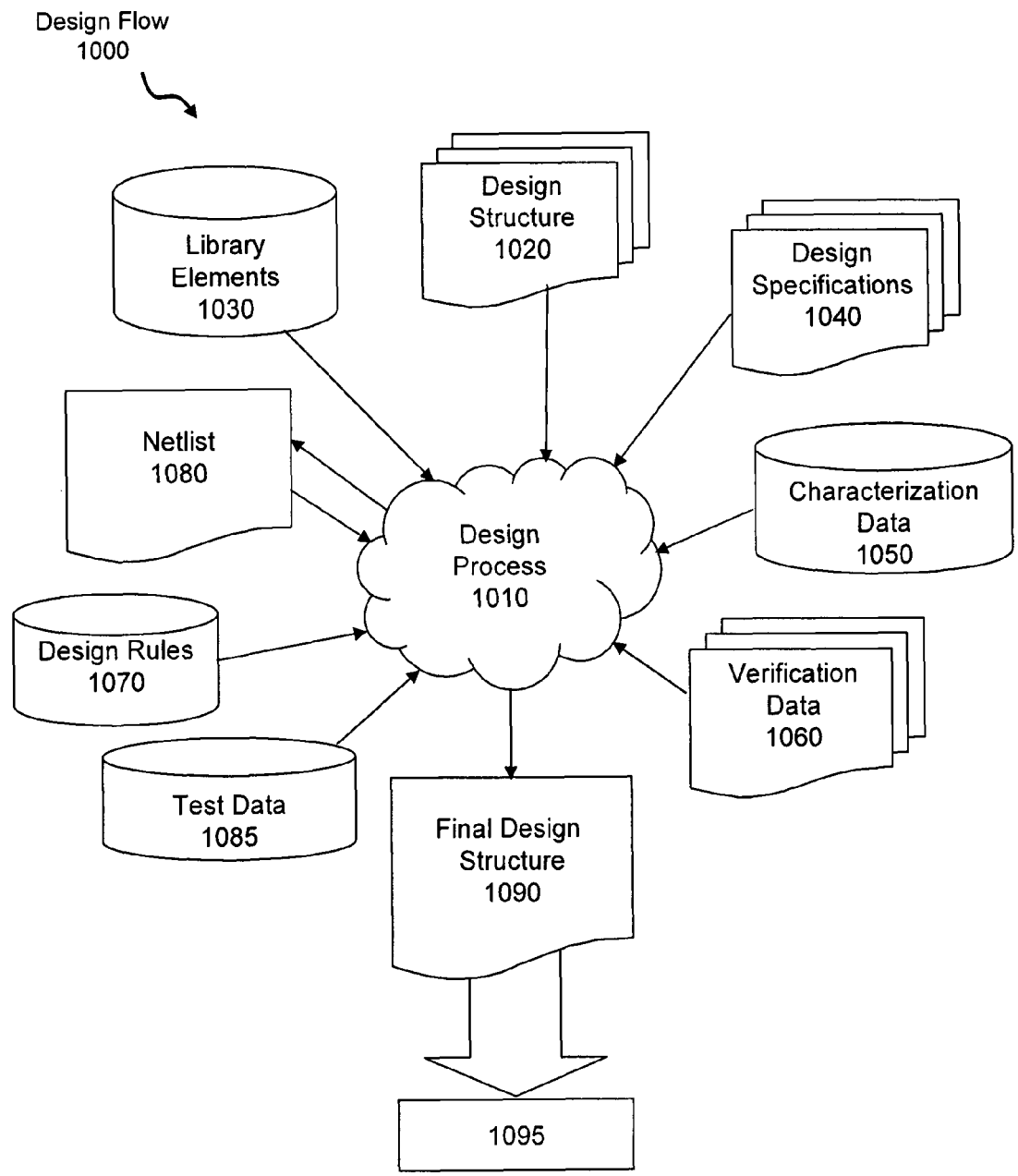
FIG. 3 depicts a block diagram of an example design flow.

FIG. 3 depicts a block diagram of an example design flow 1000, which may vary depending on the type of IC being designed. For example, a design flow 1000 for building an application specific IC (ASIC) will differ from a design flow 1000 for designing a standard component. A design structure 1020 is an input to a design process 1010 and may come from an IP provider, a core developer, or other design company. The design structure 1020 comprises a circuit 100 (e.g., an APS) in the form of schematics or HDL, a hardware-description language, (e.g., Verilog, VHDL, C, etc.). The design structure 1020 may be on one or more of machine readable medium. For example, the design structure 1020 may be a text file or a graphical representation of a circuit. The design process 1010 synthesizes (or translates) the circuit into a netlist 1080, where the netlist 1080 is, for example, a list of fat wires, transistors, logic gates, control circuits, I/O, models, etc., and describes the connections to other elements and circuits in an integrated circuit design and recorded on at least one machine readable medium.

The design process 1010 includes using a variety of inputs; for example, inputs from library elements 1030 which may house a set of commonly used elements, circuits, and devices, including models, layouts, and symbolic representations, for a given manufacturing technology (e.g., different technology nodes, 32 nm, 45 nm, 90 nm, etc.), design specifications 1040, characterization data 1050, verification data 1060, design rules 1070, and test data files 1085, which may include test patterns and other testing information. The design process 1010 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 1010 without deviating from the scope and spirit of the invention.

Ultimately, the design process 1010 translates the circuit, along with the rest of the integrated circuit design (if applicable), into a final design structure 1090 (e.g., information stored in a GDS storage medium). The final design structure 1090 may comprise information such as, for example, test data files, design content files, manufacturing data, layout parameters, wires, levels of metal, vias, shapes, test data, data for routing through the manufacturing line, and any other data required by a semiconductor manufacturer to produce circuit 100. The final design structure 1090 may then proceed to a stage 1095 of design flow 1000; where stage 1095 is, for example, where final design structure 1090: proceeds to tape-out, is released to manufacturing, is sent to another design house or is sent back to the customer.

The foregoing description of the preferred embodiments of this disclosure has been presented for purposes of illustration and description. It is not intended to be exhaustive or to limit the disclosure to the precise form disclosed, and obviously, many modifications and variations are possible.

What is claimed is:

1. A design structure in a data format tangibly embodied in a machine readable medium used in a design flow process for designing an integrated circuit (IC), the design structure comprising a circuit, the circuit comprising:
   a pixel cell for generating an analog signal in response to detecting a light source;
   a source follower transistor having a gate for receiving the analog signal and a source for outputting a source follower signal, wherein the source is coupled to a first current source;
   a replica source follower transistor having a gate for receiving a fixed voltage from a bandgap reference circuit and a source for outputting a reference voltage, wherein the source of the replica source follower transistor is coupled to a second current source, and wherein the isolation source follower transistor and replica source follower transistor are biased with substantially identical current densities; and
   a comparator for comparing the source follower signal with the reference voltage.

2. The design structure of claim 1, wherein the design structure comprises a netlist, which describes the circuit.

3. The design structure of claim 1, wherein the design structure resides on a GDS storage medium.

4. The design structure of claim 1, wherein the design structure includes test data files, characterization data, verification data, or design specifications.

* * * * *